(12) United States Patent
Galtarossa (10) Patent No.: US 6,229,599 B1
(45) Date of Patent: May 8, 2001

(54) APPARATUS FOR MEASURING CHARACTERISTICS OF AN OPTICAL FIBER

(75) Inventor: Andrea Galtarossa, Padua (IT)

(73) Assignee: Cselt - Centro Studi e Laboratori Telecomunicazioni S.p.A., Turin (IT)

( * ) Notice: Subject to any disclaimer, the term of this patent is extended or adjusted under 35 U.S.C. 154(b) by 0 days.

(21) Appl. No.: 09/355,293

(22) PCT Filed: Feb. 10, 1998

(86) PCT No.: PCT/IB98/00225

§ 371 Date: Jul. 26, 1999

§ 102(e) Date: Jul. 26, 1999

(87) PCT Pub. No.: WO98/36256

PCT Pub. Date: Aug. 20, 1998

(30) Foreign Application Priority Data

Feb. 13, 1997 (IT) .............................................. PD97A0025

(51) Int. Cl.[7] .................................................... G01N 21/00
(52) U.S. Cl. ............................................................ 356/73.1
(58) Field of Search ..................................... 356/364–368, 356/73.1, 345, 351; 385/27, 24, 147; 250/225, 227.1

(56) References Cited

U.S. PATENT DOCUMENTS 5,227,623 * 7/1993 Heffner .

* cited by examiner

*Primary Examiner*—Frank G. Font
*Assistant Examiner*—Tu T. Nguyen
(74) *Attorney, Agent, or Firm*—Herbert Dubno (57) ABSTRACT

The present invention aims to provide apparatus to measure the beat length, the correlation length, the polarization mode dispersion and other characteristics of single mode optical fibers related to the two polarization modes of the fiber at different positions along the length of the fiber. The present invention also aims to provide apparatus for the measurement of characteristics of an optical fiber with access to only one end of the fiber.

17 Claims, 6 Drawing Sheets

APPARATUS FOR MEASURING CHARACTERISTICS OF AN OPTICAL FIBER

CROSS REFERENCE TO RELATED APPLICATIONS

This application is a national stage application of PCT/IB98/00225 filed Feb. 10, 1998 under the International Convention.

FIELD OF THE INVENTION

This invention relates to an apparatus for measuring characteristics of an optical fiber. More specifically, this invention relates to apparatus for measuring characteristics of an optical fiber such as beat length, correlation length, and polarization mode dispersion, at different positions along the length of the optical fiber.

BACKGROUND OF THE INVENTION

Within the field of optical fiber telecommunications, the current upper limit on the bit rate of detection arises from the birefringence distributed along the length of a single-mode optical fiber. The birefringence may be due to non-circularity of the core of the optical fiber, and to stresses within the fiber. The birefringence may also vary along the length of the fiber. However, the birefringence may also be caused by external forces acting upon the fiber, and to temperature variations, and these effects vary both along the length of the fiber and with time. The overall birefringence of a length of fiber thus varies over time with a magnitude which is random.

An ideal single-mode optical fiber guides optical power in the fundamental mode as two identical but orthogonal polarization modes, so that the modes are completely interchangeable. However, imperfections in the fiber and the effect of external parameters lead to the optical power within the two polarization modes both differing in magnitude and travelling at slightly different speeds so that a differential group delay exists between the modes. The birefringence determines the magnitude of the differential group delay, and the optical power within the two polarization, and so the width of an optical pulse travelling along the optical fiber will vary randomly by an amount determined by the random fluctuations in the birefringence. This effect is called the polarization mode dispersion, and it is of particular concern because it limits the performance of optical fiber telecommunications systems in a way that cannot be predicted accurately, and hence cannot be compensated.

Although polarization mode dispersion is usually considered to be a characteristic of the total length of an optical fiber, the effects which give rise to it may act over relatively short sections of the fiber. In particular, the polarization mode dispersion of an optical fiber cable may increase significantly after installation, arising from a change in the birefringence over one particular short length within the fiber. Accordingly, it would be useful to be able to measure characteristics related to the two polarization modes of a single-mode optical fiber, such as polarization mode dispersion, at different positions along the length of the optical fiber so that any local effect can be identified at a particular length position in the optical fiber. This would be particularly useful if the measurement were able to be made with access to just one end of the fiber in the same way that optical time domain reflectometers are used to measure the optical loss of fibers. Existing commercial apparatus can measure the overall polarization mode dispersion of an optical fiber and requires access to both ends of the fiber. The existing commercial apparatus does not enable the measurement of the polarization mode dispersion at different positions along the length of the optical fiber. The magnitude of the birefringence as it varies along the fiber may be characterized as a beat length, and the statistical correlation between two sections of fiber may be related by a correlation length. Both these parameters are useful for describing the behavior of the fiber, and the environment it is experiencing, and are inherently characteristics of length position within the fiber.

There are a number of known methods of measuring polarization mode dispersion, and associated characteristics of single-mode optical fibers, which provide a single measurement for the total length requiring access to both ends of the fiber. In addition, optical time domain reflectometry is a well-established technique for measuring the optical loss of an optical fiber at different positions along the length of the fiber and requiring access to only one end of the fiber. The present invention is based on the discovery that it is possible to apply the existing measurement techniques of polarization mode dispersion to modified versions of optical time domain reflectometry apparatus, and thus to derive useful measurements.

OBJECTS OF THE INVENTION

The present invention aims to provide apparatus to measure the beat length, the correlation length, the polarization mode dispersion, and other characteristics of single mode optical fibers related to the two polarization modes of the fiber at different positions along the length of the fiber. The present invention also aims to provide apparatus for the measurement of characteristics of an optical fiber with access to only one end of the fiber.

SUMMARY OF THE INVENTION

According to a non-limiting embodiment of the present invention, there is provided apparatus for measuring characteristics of an optical fiber, at different positions along the length of the optical fiber, which apparatus comprises:

tunable source means for providing optical pulses of light which have a variable wavelength and a narrow wavelength bandwidth;

polarization selecting coupler means which comprises an input port, a bi-directional port and an output port, and which is for conveying light between the input port, the bi-directional port and the output port, such that a state of polarization of the optical pulses of light input at the input port becomes a particular launch state of polarization of light output from the bi-directional port, and such that one or more particular receive states of polarization of light input at the bi-directional port become one or more separate channels of light output from the output port;

optical connector means for making an optical connection between the bi-directional port of the polarization selecting coupler means and one end of the optical fiber, so that the light output from the bi-directional port of the polarization selecting coupler means is launched into the optical fiber and light backscattered within the optical fiber is received as the light input at the bi-directional port of the polarization selecting coupler means;

photodetector means for converting the intensity of each of the one or more separate channels of light output from the output port of the polarization selecting coupler means into one or more separate electrical signals;

launch controller means for controlling the timing, duration and wavelength of the optical pulses provided by the tunable source means, and for specifying the particular launch state of polarization of the light output from the bi-directional port of the polarization selecting coupler means;

receive controller means for controlling the timing of measuring the electrical signals provided by the photodetector means, and for specifying the one or more particular receive states of polarization of light input at the bi-directional port of the polarization selecting coupler means; and processor means for measuring and processing the electrical signals provided by the photodetector means into measurements of the characteristics of the optical fiber.

The tunable source means may be a semiconductor laser diode, a solid state laser, or a gas laser, with a wavelength bandwidth preferably less than 0.1 nanometers and a peak power preferably greater than one milliwatt. The tunable source means may include optical amplifiers, which may take the form of semiconductor or optical fiber amplifiers. The tunable source means may also include means for defining a specific state of polarization of the light emitted. The light emitted by the tunable source means may be any electromagnetic radiation at wavelengths appropriate for the measurements being made and the optical fiber under test. Preferably, the wavelength of the tunable source means is in the range of approximately 1100 nanometers to 1800 nanometers. The wavelength of the tunable source means maybe varied by any method appropriate for the embodiment of the tunable source means, such as by varying the temperature of a semiconductor laser diode. Preferably, the wavelength of the tunable source means is varied by increments of wavelength which may be a small fraction of the wavelength bandwidth, and over a range which may be substantially greater than the wavelength bandwidth. More preferably, the wavelength of the tunable source is varied by increments of less than 0.1 nanometers over a range of greater than 10 nanometers.

The optical connector means may comprise of one of the many optical fiber connectors commonly used to join two optical fibers. Preferably, the optical connector means has very low polarization dependent loss.

The photodetector means may comprise one or more PIN diodes, avalanche photodiodes, phototransistors, or photomultipliers.

The launch controller means, receive controller means, and processor means may comprise personal computers, microprocessors, dedicated electronic processors, analogue to digital convertors, digital to analogue convertors, electric motors, andlor other electronic and electromechanical components, as are well-known to someone skilled in the art of measurement instrumentation. The processor means may include processing algorithms which may be related to the physical theory of measurement, such as for polarization mode dispersion. The processor means may also include algorithms which may be appropriate only for a specific optical fiber and specific conditions, where the measurement problem may not be fully tractable to known theoretical analysis, but, nevertheless, measurements obtained by the current invention may be correlated with the optical fiber to provide useful information about the behaviour of the specific optical fiber.

In a first embodiment of the present invention, the apparatus is one in which measurements of the state of polarization of the backscattered light are made consecutively, and such apparatus is one in which there is only one separate channel of light output from the output port of the polarization selecting coupler means, such that the photodetector means converts the intensity of the said one separate channel of light; and in which the polarization selecting coupler means comprises:

polarization independent coupler means which comprises an input port, a bi-directional port and an output port, and which is for conveying light between the input port, the bi-directional port and the output port, with negligible polarization dependent loss of the light, such that light input at the input port becomes light output from the bi-directional port, light input at the bi-directional port becomes light output from the output port, and the light is substantially unchanged as it passes in either direction between the bi-directional port of the polarization selecting coupler means and the bi-directional port of the polarization independent coupler means;

polarization controller means for converting the state of polarization of light input at the input port of the polarization selecting coupler means into a particular launch state of polarization of light input at the input port of the polarization independent coupler means, such that the particular launch state of polarization is selected as specified by the launch controller means; and polarization analyzer means for selecting a particular receive state of polarization of the light output from the output port of the polarization independent coupler means to become the one separate channel of light output from the output port of the polarization selecting coupler means, such that the particular receive state of polarization is selected as specified by the receive controller means.

The polarization independent coupler means may include one or more bulk-optic components, such as non-polarising beam-splitters, or may include one or more optical fiber components, such as directional fiber couplers or optical fiber circulators. In addition, the polarization independent coupler means may include an active element such as an acousto-optic deflector.

The polarization controller means may comprise one or more bulk-optic birefringent waveplates, such as half-wave and quarter-wave plates, and linear or circular polarizers, that may be rotated about an optical axis in an optical path, and/or inserted and removed from the optical path, to select a specific state of polarization of the light output from the polarization controller means. The polarization controller means may also comprise contiguous sections of birefringent optical fiber that may be positioned relative to each other to alter the state of polarization of the light output. The polarization controller means may also include one or more planar integrated optics circuits in which the state of polarization of the light output may be selected by electrical signals supplied by the launch controller means.

The polarization analyzer means may comprise one or more bulk-optic birefringent waveplates, such as half-wave and quarter-wave plates, and linear or circular polarizers, that may be rotated about an optical axis in an optical path, and/or inserted and removed from the-optical path, to select a specific state of polarization of the light input from the polarization independent coupler means. The polarization analyzer means may also include one or more planar integrated optics circuits in which the state of polarization of the light output is selected by electrical signals supplied by the receiver controller means.

In the first embodiment of the present invention, the apparatus may be one in which the launch controller means specifies, and the polarization controller means selects, only two particular launch states of polarization at each of the wavelengths of the tunable source means controlled by the launch controller means.

In the first embodiment of the present invention, the apparatus may alternatively be one in which the launch controller means specifies, and the polarization controller means selects, only one separate particular launch state of polarization at each of the wavelengths of the tunable source means controlled by the launch controller means. The polarization controller means may comprise a single bulk-optic component, such as a linear polarizer or a circular polarizer.

In the first embodiment of the present invention, the apparatus may be one in which the receive controller means specifies, and the polarization analyzer means selects, only two particular receive states of polarization of the light output from the output port of the polarization independent coupler means for each of the particular launch states of polarization of the light input at the input port of the polarization independent coupler means at each of the wavelengths of the tunable source means; and is one in which the processor means is such that the state of polarization of the light backscattered by the optical fiber is deduced from the two separate particular receive states of polarization.

In a second embodiment of the present invention, the apparatus is one in which the polarization controller means comprises an input polarizer means for selecting a single particular launch state of polarization for the light input to the input port of the polarization independent coupler means, and the polarization analyzer means comprises an output polarizer means for selecting a single particular receive state of polarization of the light output from the output port of the polarization independent coupler means. The input polarizer means may comprise a linear polarizer, and the output polarizer means may comprise a linear polarizer.

In a third embodiment of the present invention, the apparatus is one in which measurements of the state of polarization of the backscattered light are made consecutively, and such apparatus is one in which there is only one separate channel of light output from the output port of the polarization selecting coupler means, such that the photodetector means converts the intensity of the one separate channel of light; and in which the polarization selecting coupler means comprises:
   polarization independent coupler means which comprises an input port, a bi-directional port and an output port, and which is for conveying light between the input port, the bi-directional port and the output port, with negligible polarization dependent loss of the light, such that light input at the input port becomes light output from the bi-directional port, light input at the bi-directional port becomes light output from the output port, the light is substantially unchanged as it passes from the input port of the polarization selecting coupler means to the input port of the polarization independent coupler means, and the light is substantially unchanged as it passes from the output port of the polarization independent coupler means to the output port of the polarization selecting coupler means; and
   bi-directional polarizer means for selecting a particular state of polarization of the light that passes in either direction between the bi-directional port of the polarization independent coupler means and the bi-directional port of the polarization selecting coupler means.

In the third embodiment of the present invention, the bi-directional polarizer means may comprise a linear polarizer.

In a fourth embodiment of the present invention, the apparatus is one in which measurements of the state of polarization of the backscattered light may be made in parallel, and such apparatus is one in which there are two or more separate channels of light output from the output port of the polarization selecting coupler means, such that the photodetector means converts the intensities of the said two or more separate channels of light, and such that the polarization selecting coupler means comprises:
   polarization independent coupler means which comprises an input port, a bi-directional port and an output port, and which is for conveying light between the input port, the bi-directional port and the output port, with negligible polarization dependent loss of the light, such that light input at the input port becomes light output from the bi-directional port, light input at the bi-directional port becomes light output from the output port, and the light is substantially unchanged as it passes in either direction between the bi-directional port of the polarization selecting coupler means and the bi-directional port of the polarization independent coupler means;
   polarization controller means for converting the state of polarization of light input at the input port of the polarization selecting coupler means into a particular launch state of polarization of light input at the input port of the polarization independent coupler means, such that the particular launch state of polarization is selected as specified by the launch controller means; and
   polarization parallel analyzer means for selecting two or more particular receive states of polarization of the light output from the output port of the polarization independent coupler means to become the two or more separate channels of light output from the output port of the polarization selecting coupler means.

In the fourth embodiment of the present invention, the polarization controller means may be such that only two separate particular launch states of polarization may be selected at each of the wavelengths of the tunable source means controlled by the launch controller means, or, alternatively, the polarization controller means may be such that only one separate particular launch state of polarization may be selected at each of the wavelengths of the tunable source means controlled by the launch controller means.

The polarization parallel analyzer means may include bulk-optic birefringent waveplates, such as half-wave and quarter-wave plates, and linear or circular polarizers, that may be placed in two or more separate optical paths, to select two or more particular receive states of polarization of the light input from the polarization independent coupler means, such that the light output comprises two or more separate channels. The polarization parallel analyzer means may also include one or more planar integrated optics circuits in which two or more receive states of polarization of the light output in two or more separate channels may be selected by electrical signals supplied by the receiver controller means.

In the fourth embodiment of the present invention, the apparatus may be one in which the polarization parallel analyzer means comprises a beam separator means for separating the light input into two or more separate beams with negligible polarization dependent loss, and comprises two or more single polarizer means for selecting a particular receive state of polarization for each of the said two or more separate beams.

The two or more single polarizer means may be such that a first single polarizer means comprises a linear polarizer, such that a second single polarizer means also comprises a linear polarizer but with a different orientation of its polarization axis, and such that a third single polarizer means comprises a circular polarizer.

Alternatively, in the fourth embodiment of the present invention, the apparatus may be one in which the polarization parallel analyzer means selects only two particular receive states of polarization of the light output from the output port of the polarization independent coupler means for each of the separate particular launch states of polarization light input at the input port of the polarization independent coupler means at each of the wavelengths of the tunable source means; and is one in which the processor means is such that the state of polarization of the light backscattered by the optical fiber is deduced from the two particular receive states of polarization.

In this alternative embodiment of the present invention, the apparatus may be one in which the polarization parallel analyzer means comprises a beam separator means for separating the light input into only two separate beams, and in which the apparatus includes only two single polarizer means for selecting a particular receive state of polarization for each of the said two separate beams.

The two single polarizer means may be such that a first single polarizer means comprises a linear polarizer, and such that a second single polarizer means also comprises a linear polarizer but with a different orientation of its polarization axis, or such that the second single polarizer means comprises a circular polarizer.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
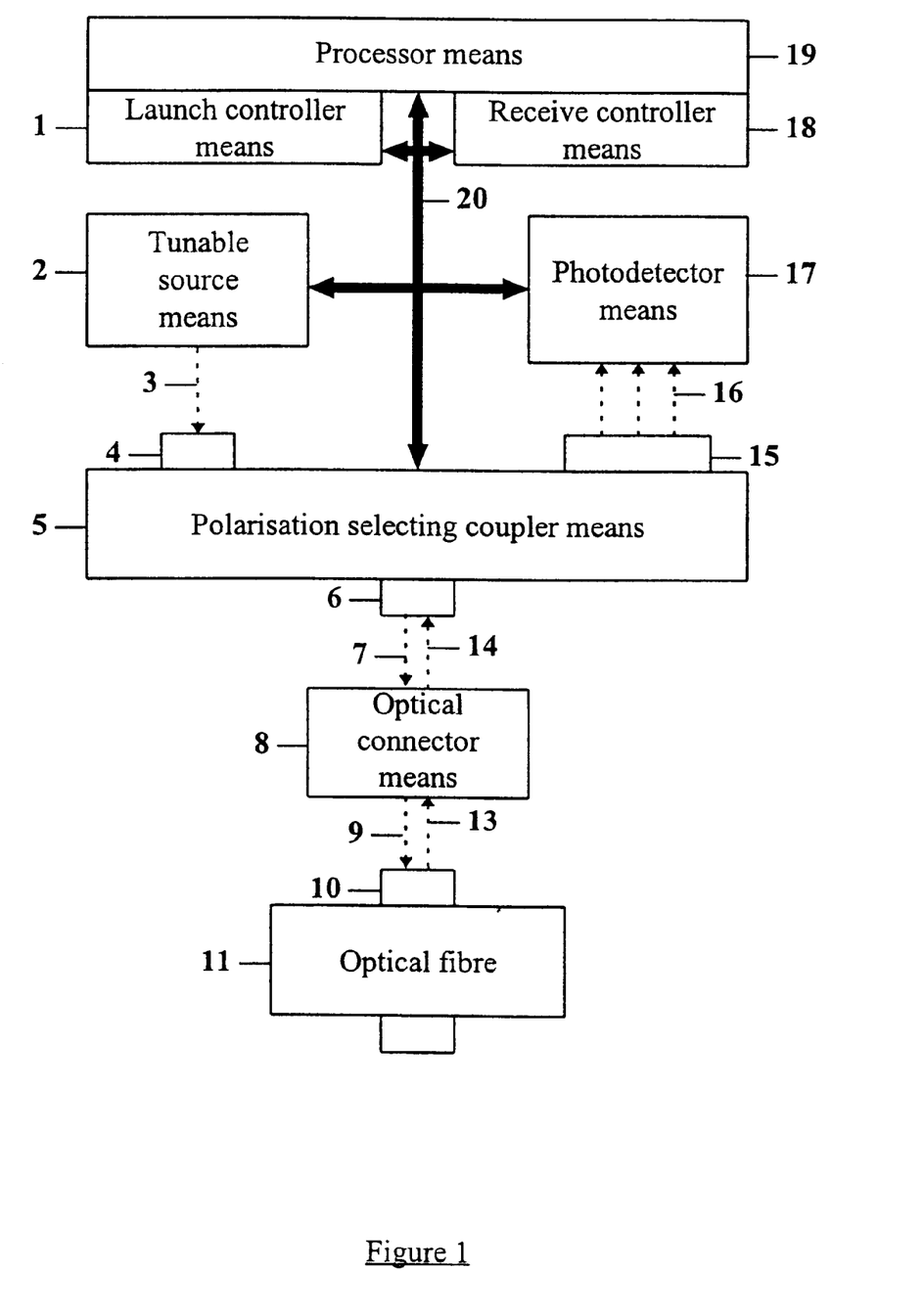
FIG. 1 is a block diagram which shows first apparatus for measuring characteristics of an optical fiber, and illustrates the relationships between the tunable source means, the polarization selecting coupler means, the optical connector means, the optical fiber, the photodetector means, the launch controller means, the receive controller means, and the processor means.

FIG. 1 shows a launch controller means 1 which selects the wavelength of a tunable source means 2 and the timing parameters of a sequence of launch optical pulses 3 via a communications link 20. The launch optical pulses 3 enter a polarization selecting coupler means 5 at an input port 4 and are output at a bi-directional port 6 as launch optical pulses 7 with a particular launch state of polarization specified by the launch controller means 1 and selected by the polarization selecting coupler means 5 via the communications link 20. The launch optical pulses 7 pass through an optical connector means 8 and enter the near end 10 of an optical fiber 11 as launch optical pulses 9. The optical connector means 8 facilitates the optical connection between the optical fiber 11 and the polarization selecting coupler means 5. As the launch optical pulses 9 pass along the optical fiber 11, some light is backscattered by the physical process of Rayleigh scattering, and returns back along the optical fiber 11, arriving at the near end 10 as backscattered light 13 with a specific state of polarization, determined by the state of polarization of the launch optical pulses 9 and the polarization characteristics of the route taken through the optical fiber 11. The backscattered light 13 passes back through optical connector means 8 to enter the bi-directional port 6 of the polarization selecting coupler means 5 as backscattered light 14. One or more particular receive states of polarization of the backscattered light 14 are selected by the polarization selecting coupler means 5 via the communications link 20 as the backscattered light 14 passes from bi-directional port 6 to output port 15 to become one or more separate channels of light 16. A receive controller means 18 specifies, via the communications link 20, and the polarization selecting coupler means 5 selects a particular receive state of polarization of the backscattered light 14 to be output in each of the separate channels of light 16. The photodetector means 17 converts the intensity of the light in each of the separate channels of light 16 into separate electrical signals which are controlled by the receive controller means 18 so that they are transferred to a processor means 19 by the communications link 20 at selected intervals of time relative to the launch optical pulses 3. These intervals of time determine the position in length within the optical fiber 11 from which the light 16 was backscattered. In this way, the processor means 19 collects a set of data consisting of the state of polarization of the backscattered light 13 as a function of the state of polarization of the launch optical pulses 9, a function of the position in length within the optical fiber 11, and a finction of the wavelength of the launch optical pulses 3 generated by the tunable source means 2. The processor means 19 may then compute a range of different characteristics of the optical fiber 11, including beat length, correlation length, and polarization mode dispersion. Polarization mode dispersion may be computed by a number of well-known methods, some of which are detailed below with reference to other embodiments of the present invention.

Figure 2:
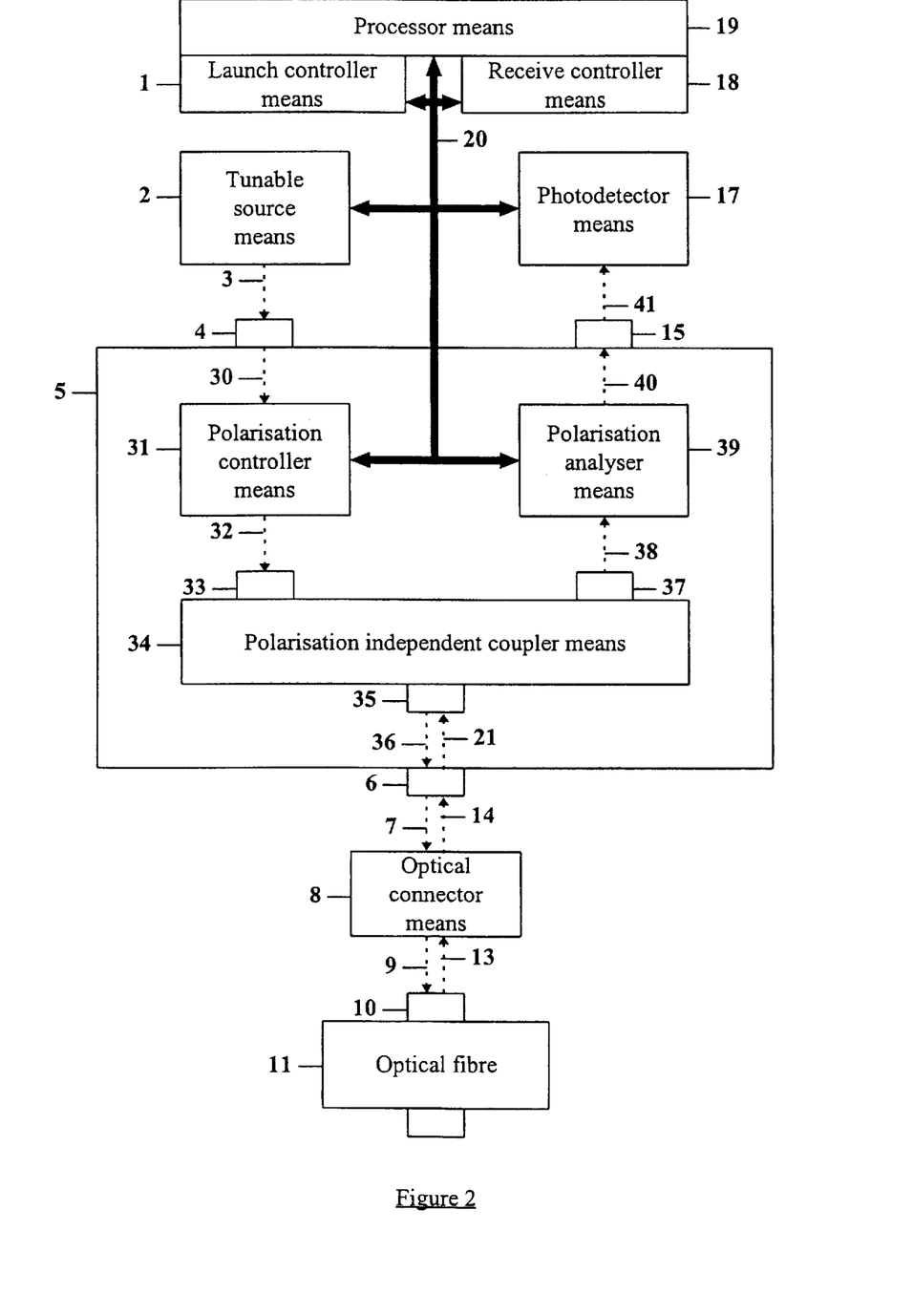
FIG. 2 is a block diagram which shows apparatus of the present invention in which the polarization controller means, the polarization independent coupler means, and the polarization analyzer means are shown for only one separate channel of light output from the output port of the polarization selecting coupler means.

Referring to FIG. 2, the polarization selecting coupler means 5 is such that only one channel of light 41 is output from the output port 15. The launch optical pulses 3 enter input port 4 to become launch optical pulses 30 which enter polarization controller means 31. The launch controller means 1 specifies, and the polarization controller means 31 selects, a particular launch state of polarization for the launch optical pulses 32 which leave the polarization controller means 31 and enter a polarization independent coupler means 34 through input port 33. The launch optical pulses 32 are output from the polarization independent coupler means 34 at a bi-directional port 35 as launch optical pulses 36 and then output from bi-directional port 6 as launch optical pulses 7, having incurred negligible polarization dependent loss. The backscattered light 14 enters through the bi-directional port 6 to become backscattered light 21 which enters the bi-directional port 35 and is output from the output port 37 as backscattered light 38, having incurred negligible polarization dependent loss. A polarization analyzer means 39 selects a particular receive state of polarization of backscattered light 38 to be output as backscattered light 40, where the particular receive state of polarization is specified by the receive controller means 18 via the communications link 20. The backscattered light 40 is output from the output port 15 as backscattered light 41, and the intensity of backscattered light 41 is then measured by photodetector means 17. In a typical measurement sequence determined by the processor means 19, one or more particular receive states of polarization of backscattered light 38 may be selected, and the intensity of backscattered light 41 measured, consecutively, at each of one or more particular launch states of polarization selected by the polarization controller means 31 at each of the selected wavelengths of tunable source means 2, over a range of timing intervals which represent a range of length position within the optical fiber 11. A complete state of polarization of the backscattered light 13 may be computed by the processor means 19 from the measurements made by the photodetector means 17 for three or more separate particular receive states of polarization selected by the polarization analyzer means 39. Polarization mode dispersion may be computed by the well-known method of Jones Matrix Eigenanalysis. As can be appreciated from FIG. 2, at each of two separate wavelengths of tunable source means 2, a Jones matrix of the optical fiber 11 is obtained by measuring three complete states of polarization of the backscattered light 13 for three separate particular launch states of polarization of the launch optical pulses 9 and using a processing algorithm such as that described in, for example, R. C. Jones, "A new calculus for the treatment of optical systems VI: Experimental determination of the Matrix", J. Optical.Soc.Amer., Vol.37, No.2, pp110–112, 1947. The two Jones matrices at the two separate wavelengths are then processed by an algorithm such as that described in, for example, ANSI/TIA/EIA-455-122-1996, "FOTP-122 Polarization Mode Dispersion Measurement for Single-Mode Optical Fibers by Jones Matrix Eigenanalysis", to give the polarization mode dispersion as a single value for the wavelength range defined by the two wavelengths at which the measurements were made. It may be assumed that the range of wavelengths in the backscattered light 13 may be small enough for the backscattered light 13 to be considered to be fully polarized.

In another embodiment of the present invention, and also with reference to FIG. 2, the launch controller means 1 specifies and the polarization controller means 31 selects only two separate particular launch states of polarization for the launch optical pulses 9 so that only two separate complete states of polarization of the backscattered light 13 are measured at each of the wavelengths of the tunable source means 2 selected by the launch controller means 1. Although two complete states of polarization are insufficient to define a Jones matrix of the optical fiber 11, it is possible to compute the polarization mode dispersion using the well-known Poincaré sphere method as described in, for example, N. S. Bergano, C. D. Poole, R. E. Wagner, "Investigation of Polarization Dispersion in Long Lengths of Single-Mode Fiber using Multilongitudinal Mode Lasers", IEEE Journal of Lightwave Technology, Vol.LT-5, No.11, pp. 1618–1622, 1987. It is well-known that a complete state of polarization of light may be described by a Stokes vector, which may be visualized as a line connecting a point on the surface of a sphere of unit radius to the center of the sphere where the sphere is called the Poincaré sphere, as described in, for example, D. S. Kliger, J. W. Lewis, C. E. Randall, "Polarised Light in Optics and Spectroscopy", Academic Press, ISBN 0-12-414975-8, 1990. The radius of unity for the Poincaré sphere follows from the assumption that the range of wavelengths in the backscattered light 13 is small enough for the backscattered light 13 to be considered to be fully polarized. At any one wavelength of the tunable source means 2, and for timing of measurement by the receive controller means 18 so that the backscattered light 13 comes from a specific length position in the optical fiber 11, the Stokes vector of the measured state of polarization of backscattered light 13 describes a great circle plane of the Poincaré sphere, as the state of polarization of the launch optical pulses 9 is changed by the polarization controller means 31. A great circle is defined as being a circle on the surface of a sphere whose center coincides with the center of the circle. Accordingly, the great circle plane may be defined uniquely by the measurement of just two complete states of polarization of backscattered light 13 for two separate, preferably orthogonal, states of polarization of launch optical pulses 9. At two different wavelengths of the tunable source means 2, two different great circle planes may be obtained, and these plane intersect in a diameter of the Poincaré sphere. The two points where this diameter intersects with the surface of the sphere are called the principal states of polarization, and may be related to a well-known mathematical formulation as described in, for example, C. D. Poole, R. E. Wagner, "Phenomenological approach to polarization dispersion in long single-mode fibers", Electronics Letters, Vol.22, No.19, pp1029–1030, 1986. Accordingly, the great circle plane can be visualized as rotating about the principal states of polarization as the wavelength changes, and it is well-known that the angle of rotation leads directly to the polarization mode dispersion, as described in, for example, C. D. Poole, N. S. Bergano, R. E. Wagner, H. J. Schulte, "Polarization Dispersion and Principal States in a 147-km Undersea Lightwave Cable", IEEE Journal of Lightwave Technology, Vol.6, No.7, pp1185–1190, 1988.

In another embodiment of the present invention, and also with reference to FIG. 2, the launch controller means 1 specifies and the polarization controller means 31 selects only one separate particular launch state of polarization for the launch optical pulses 9 so that only one complete state of polarization of the backscattered light 13 is measured at each of the wavelengths of the tunable source means 2 selected by the launch controller means 1. In the description of the previous embodiment of the present invention, it was described how the polarization mode dispersion was obtained from the angle between two great circle planes, each measured at a separate wavelength. A single Stokes vector in one of these planes will describe a small circle on the surface of the Poincaré sphere as the wavelength changes and the great circle plane rotates, where the center of the small circle lies on the diameter that is the intersection of the great circle planes which links the principal states of polarization. Three separate measurements of position on the small circle, obtained from three separate measurements of the complete state of polarization of backscattered light 13 at three separate wavelengths of tunable source means 2, are sufficient to define the center of the small circle and thus the axis of rotation of the great circle planes, as shown in, for example, D. Andresciani, F. Curti, F. Matera, B. Daino, "Measurement of group-delay difference between the principal states of polarization on a low-birefringence terrestrial fiber cable", Optics Letters, Vol.12, pp.844–846, 1987. The polarization mode dispersion may then be computed from the angle of rotation of the great circle planes.

In another embodiment of the present invention, and also with reference to FIG. 2, the polarization analyzer means 39 selects only two separate particular receive states of polarization of the backscattered light 13 which are measured at each of the wavelengths of the tunable source means 2 selected by the launch controller means 1. It is well-known that the complete state of polarization of light is described by three independent parameters, representing the amplitude of the electrical vector in two orthogonal polarizations and the phase angle between the two, which leads to three independent components for a Stokes vector for fully polarized light. Thus, three or more separate measurements are required to obtain the three independent components. However, with reference to the Poincaré sphere, the modulus of the magnitude of one component may be deduced from independent measurements of the other two components by the constraint that the magnitude of the Stokes vector is unity and hence the sum of the squares of the magnitudes of all three components must equal unity, where the factor of unity follows from the assumption that the range of wavelengths in the backscattered light 13 is small enough for the backscattered light 13 to be considered to be fully polarized. With respect to visualization on the Poincaré sphere, this means that a Stokes vector is known to the uncertainty that the third component may be at either end of a diameter of the sphere. In general, this is not sufficient to fully characterize the complete state of polarization. However, for some optical fibers 11, the rate of rotation of the great circle planes about the intersecting diameter is small enough, as the wavelength of tunable source means 2 charges, such that the relative change in the Stokes vector is small enough to remove any ambiguity caused by the uncertainty in sign of the deduced component of the state of polarization of the backscattered light 13. Accordingly, it becomes possible to estimate the polarization mode dispersion by the Jones Matrix Eigenanalysis method, the Poincaré sphere great circle method, or the Poincaré sphere small circle method as previously described. For the embodiments of the present invention previously described, the measurement of the polarization mode dispersion depends upon two or more measurements made at two or more separate wavelengths of the tunable source means 2. Preferably, the range of wavelengths in the launch optical pulses 3 may be less than the wavelength interval between the measurements, so that accurate results may be obtained from the wavelength independence of the measurements. In a preferred embodiment of the present invention, the wavelength bandwidth of the tunable source means 2 may be less than 0.1 nanometers and the smallest spacing of wavelength selectable by launch controller means 1 may be less than 0.1 nanometers, which may be particularly advantageous for investigating the change in polarization mode dispersion over the range of a few tens of nanometers of wavelength that are of current interest for wavelength division multiplexed optical communication systems.

For the embodiments of the present invention previously described, three different methods may be used to obtain a measurement of the same parameter, polarization mode dispersion. Each method is well-known and used for the measurement of the polarization mode dispersion where the state of polarization of the light passing from one end of an optical fiber to the other is measured, and so the light has made a single pass through the fiber. However, a particular characteristic of the present invention is that the light measured has traversed the optical fiber 11 in one direction, been backscattered at a particular point in the optical fiber 11, and then returned back through the same length of optical fiber 11. Accordingly, the measurement of the polarization mode dispersion made by the present invention, and described above, is that of the combined forward and backward pass of the light through the optical fiber 11. In general, the most useful parameter may be that of the polarization mode dispersion between one end of a fiber and the other end, and so it may be necessary to understand the relationship between the two measurements. The use of polarized light to study the characteristics of light backscattered from an optical fiber has been well-known since early work in the field of polarization optical time domain reflectometry (POTDR) was published, such as, for example, A. J. Rogers, "Polarization optical time domain reflectometry", Electronics Letters, Vol.16, No.13, pp.489–490, 1980. It is also well-known that circular birefringence in the fiber is not detectable in a simple and direct way by POTDR as shown in, for example, J. N. Ross, "Birefringence measurement in optical fibers by polarization-optical time-domain reflectometry", Applied Optics, Vol.21. No.19, pp.3489–3495, 1982. The inventor of the present invention has studied this problem and has concluded that the polarization mode dispersion of an optical fiber from one end to the other end may be equal to the polarization mode dispersion, when measured by light which has made a forward and a backward pass through the optical fiber, multiplied by a factor 0.64, on average. This numerical value has been obtained from many numerical simulations using mathematical models of optical fibers, as described in, for example, F. Curti, B. Daino, Q. Mao, F. Matera, C. G. Someda, "Concatenation of Polarization Dispersion in Single-Mode Fibres", Electronics Letters, Vol.25, No.4, pp.290–292, 1989. It is believed that this value is different from the value of 0.707, which would be expected for the polarization mode dispersion of two concatenated but uncorrelated lengths of fiber, because the light may be correlated between the forward and backward passes as each section of the optical fiber is always traversed twice, once in each direction. The uncertainty in the numerical factor of 0.64 is expected to be much less than the variation in the measured polarization mode dispersion arising from a general statistical Maxwellian distribution, which is typical of modem single-mode optical fibers, as discussed in, for example, F. Curti, B. Daino, G. Marchis, F. Matera, "Statistical Treatment of the Evolution of the Principal States of Polarization in Single-Mode Fibers", IEEE Journal of Lightwave Technology, Vol.8, No.8, pp 1162–1166, 1990.

The embodiments of the present invention, as previously described, obtain one or more states of polarization as a function of both wavelength of the tunable source 2 and length position within the optical fiber 11. Thus, at each wavelength the complete state of polarization as a fmction of length position within the optical fiber 11 may be derived. This function may be interpreted as resulting in an estimate of the beat length within the optical fiber, where the birefringence of the fiber is approximately constant, as described in, for example, A. Galtarossa, G. Gianello, C. G. Someda, M. Schiano, "Stress Investigation in Optical Fiber Ribbon Cable by Means of Polarization Sensitive Techniques", IEEE Photonics Technology Letters; Vol.6, No.10, pp.1232–1235, 1994. Alternatively, where the states of polarization are changing rapidly with length position arising from short range fluctuations in birefringence in the optical fiber, it may be appropriate to autocorrelate the states of polarization to arrive at a correlation length which estimates how rapidly the fluctuations in the birefringence takes place. A particular advantage of the present invention is that the complete state of polarization of the backscattered light is measured, and this is independent of the absolute intensity of the backscattered light, which means that the loss of optical power which occurs as the light traverses forward and then back through the optical fiber 11 is not important to the measurement of characteristics such as polarization mode dispersion. However, the absolute intensity of the backscattered light may be known, just as with a conventional optical time domain reflectometer, and so it may be possible to measure the optical power loss of the optical fiber 11 at the same time as making the measurements of the states of polarization.

Figure 3:
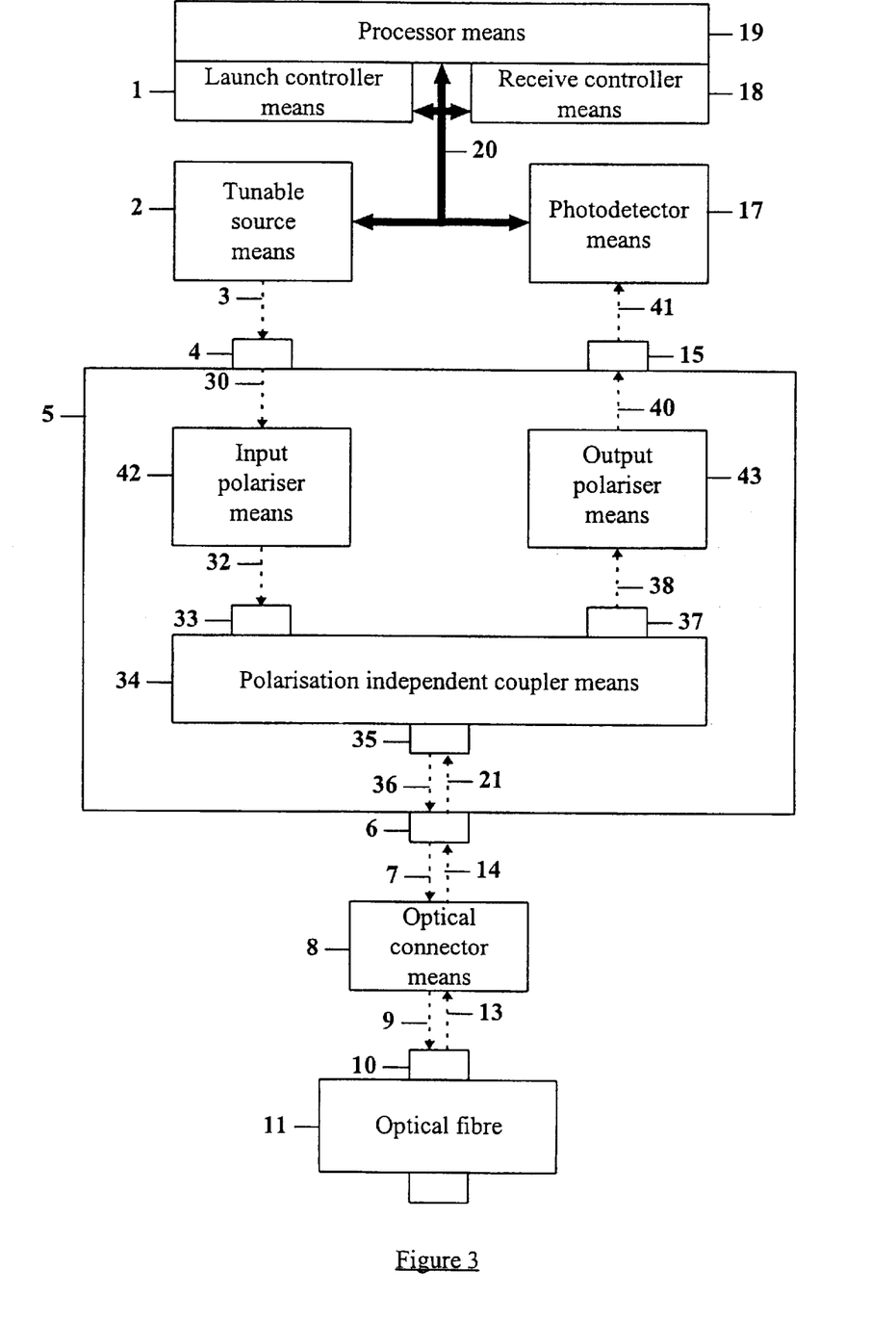
FIG. 3 is a block diagram which shows apparatus of the present invention in which the polarization selecting coupler means includes the input polarizer means and the output polarizer means.

Referring now to FIGS. 2 and 3, the polarization controller means 31 comprises an input polarizer means 42, which selects a single particular launch state of polarization for the light 32 input to the input port 33 of the polarization independent coupler means 34. The input polarizer means 42 may be a linear polarizer. In addition, the polarization analyzer means 39 comprises an output polarizer means 43 which selects a single particular receive state of polarization of the light output 38 from the output port 37 of the polarization independent coupler means 34. The output polarizer means 43 may be a linear polarizer. This embodiment of the present invention provides only one particular launch state of polarization of the launch optical pulses 9 and measures the intensity of only one particular receive state of polarization of the backscattered light 13, at each of the wavelengths of the tunable source means 2 and the length position in the optical fiber 11, determined by launch controller means 1 and receive controller means 20. This measurement of only one particular receive state of polarization of the backscattered light 13 is insufficient for the determination of the great circle planes within the Poincaré sphere representation as described previously. However, it is well-known that over a sufficient range of wavelengths the states of polarization of the backscattered light 13 will give Stokes vectors that cover most of the surface of the Poincaré sphere, and it then becomes possible to use the well known fixed-polarizer wavelength-scanning method of computing the approximate value of the polarization mode dispersion, as described in, for example, C. D. Poole, D. L. Favin, "Polarization-Mode Dispersion Measurements Based on Transmission Spectra Through a Polarizer", IEEE Journal of Lightwave Technology, Vol.12, No.6, pp917–929, 1994.

Figure 4:
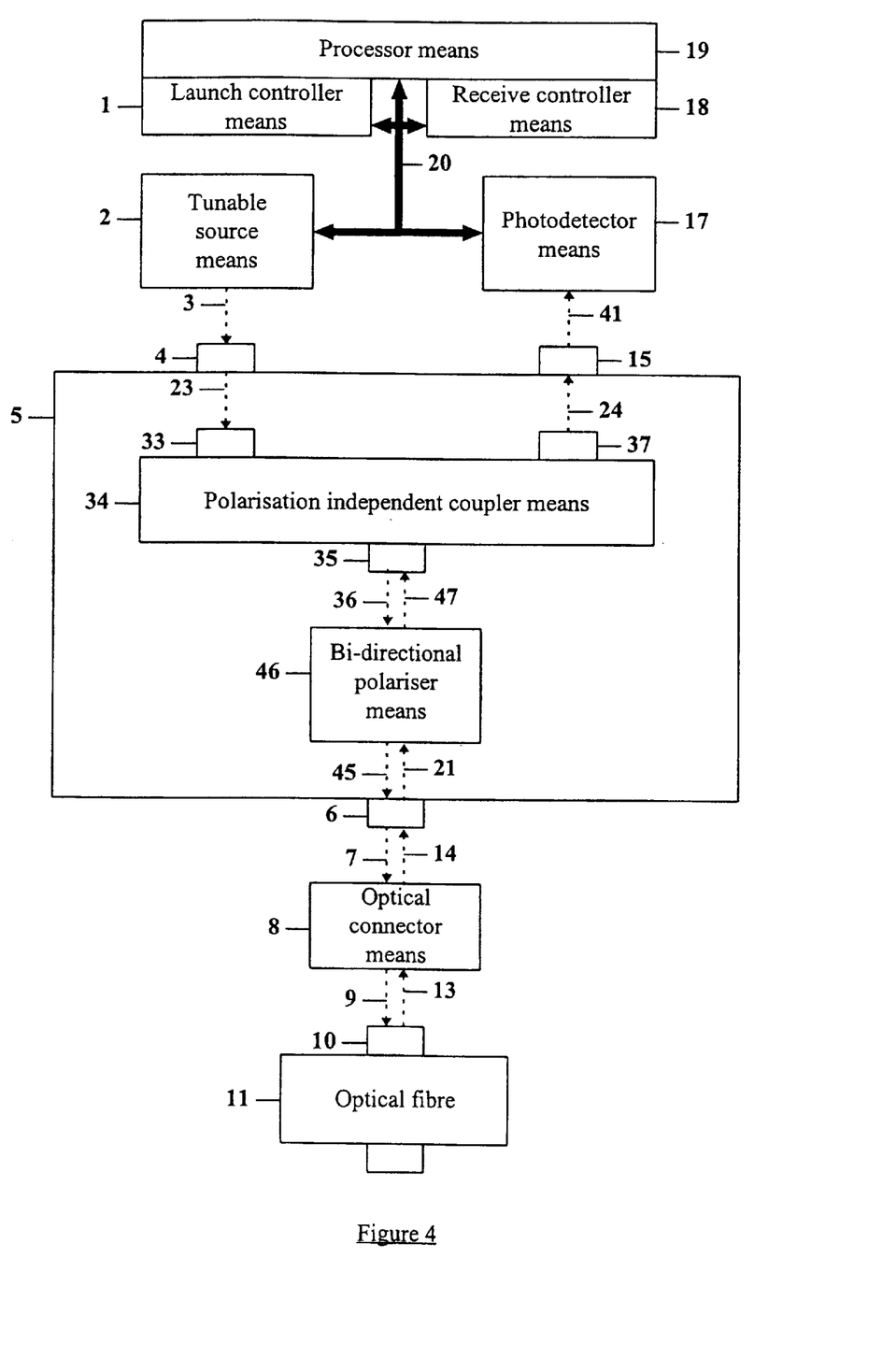
FIG. 4 is a block diagram which shows apparatus of the present invention in which the polarization selecting coupler means includes the bi-directional polarizer means.

Referring to FIGS. 1 and 4, the launch optical pulses 3 are input to the input port 4 of the polarization selecting coupler means 5 to become launch optical pulses 23. The launch optical pulses 23 are input to the input port 33 of the polarization independent coupler means 34 and are output from the bi-directional port 35 as launch optical pulses 36, having incurred negligible polarization dependent loss. Bi-directional polarizer means 46 selects one particular launch state of polarization of launch optical pulses 36 to become launch optical pulses 45 which are output from the bi-directional port 6 as the launch optical pulses 7. The backscattered light 14 is input to bi-directional port 6 to become the backscattered light 21 which returns through the bi-directional polarizer means 46 to become backscattered light 47 with one particular receive state of polarization. The backscattered light 47 is input to the bi-directional port 35 of the polarization independent coupler means 34 and is output from the output port 37 as backscattered light 24 which becomes the backscattered light 41 output from output port 15, having incurred negligible polarization dependent loss. In this way, the bi-directional polarizer means 46 selects both the particular launch state of polarization of the launch optical pulses 7, and the particular receive state of polarization of the backscattered light 41. The bi-directional polarizer means 46 may be a linear polarizer which may be of particular value for a portable and low cost embodiment of the present invention.

As with measuring polarization mode dispersion using the Jones Matrix Eigenanalysis method and the Poincaré sphere methods, described previously, the value of polarization mode dispersion measured using the fixed polarizer wavelength scanning method, described previously, needs to be corrected to take into account the correlation between the light as it passes forward through the optical fiber 11 and as it returns after being backscattered. The inventor of the present invention has studied this problem and has concluded that the polarization mode dispersion of the fiber from one end to the other end may be equal to the polarization mode dispersion, when measured by light which has made a forward and a backward pass through the optical fiber, multiplied by the factor 0.60, on average. This numerical value has been obtained from many numerical simulations using mathematical models of optical fibers, as described in, for example, F. Curti, B. Daino, Q. Mao, F. Matera, C. G. Someda, cited previously, and over the same range of models as used to obtain the numerical factor of 0.64 cited previously. The uncertainty in the numerical factor of 0.60 is expected to be much less than the variation in the measured polarization mode dispersion because of the nature of the statistical Maxwellian distribution as described in, for example, F. Curti, B. Daino, G. Marchis, F. Matera, cited previously.

Figure 5:
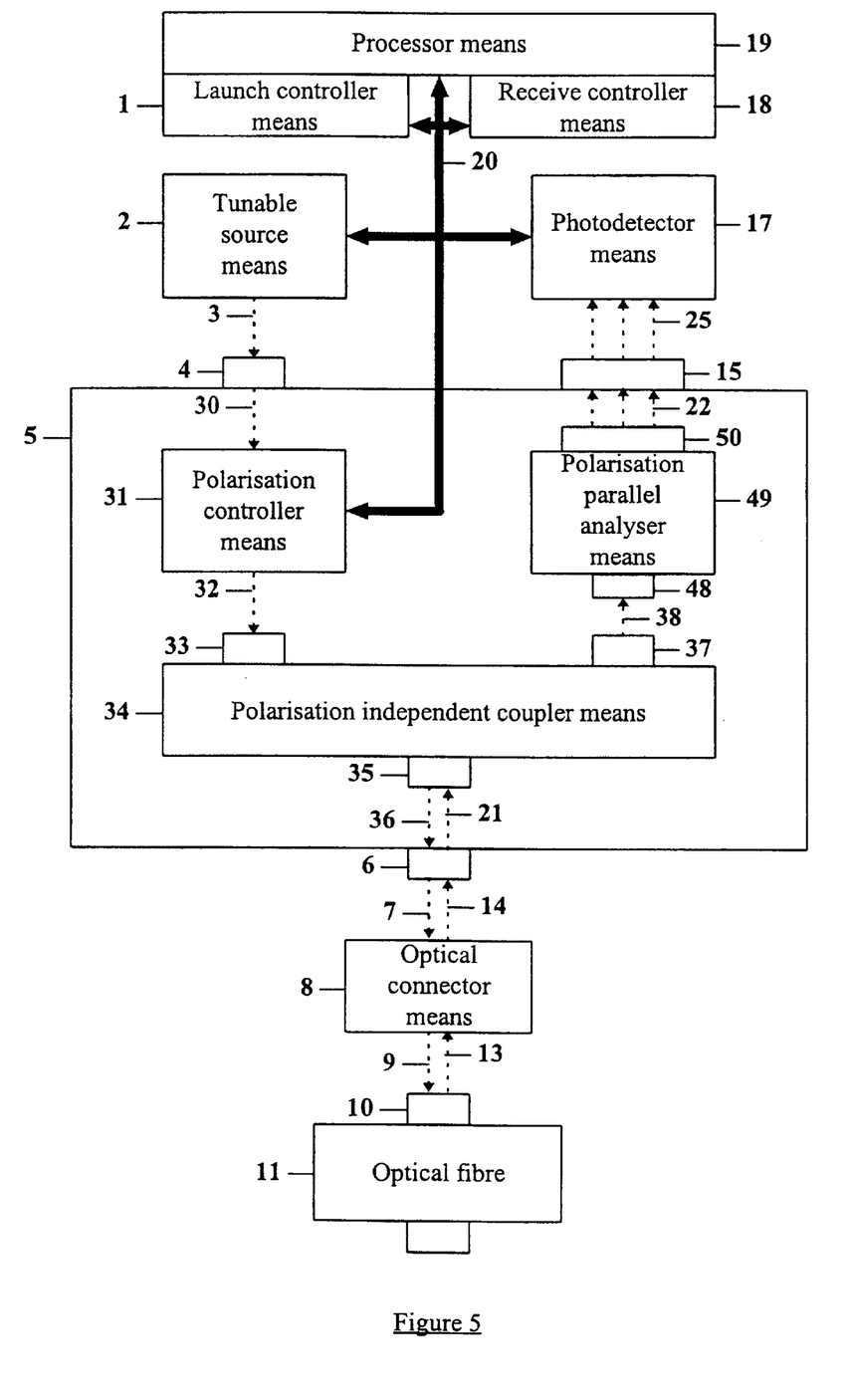
FIG. 5 is a block diagram of an apparatus of the present invention in which the polarization controller means, the polarization independent coupler means, and the polarization parallel analyzer means are shown for two or more separate channels of light output from the output port of the polarization selecting coupler means.

Referring to FIG. 5, the polarization selecting coupler means 5 is such that two or more separate channels of light 25 are output from the output port 15. The launch optical pulses 3 enter input port 4 and are output from bi-directional port 6 to become the launch optical pulses 7 with a particular launch state of polarization selected by the polarization controller means 31, and the backscattered light 13 becomes the backscattered light 38, as previously described. The backscattered light 38 is input to an input port 48 of a polarization parallel analyzer means 49 and is separated into two or more separate channels of light 22 and output from an output port 50, and which are output from the output port 15 as the separate channels of light 25. Each of the separate channels of light 22 results from the selection of a separate particular receive state of polarization of the backscattered light 38, and so photodetector means 17 may convert the intensities of the channels of light 25 into separate electrical signals in parallel. The capability of this embodiment of the present invention of making measurements in parallel may be applied to all the different methods of measuring the complete state of polarization of the backscattered light 13 described previously, and may be particularly advantageous because there may be no need to make measurements of the individual components of the complete state of polarization of the backscattered light 13 consecutively, and so the time taken to make an overall measurement may be reduced.

Figure 6:
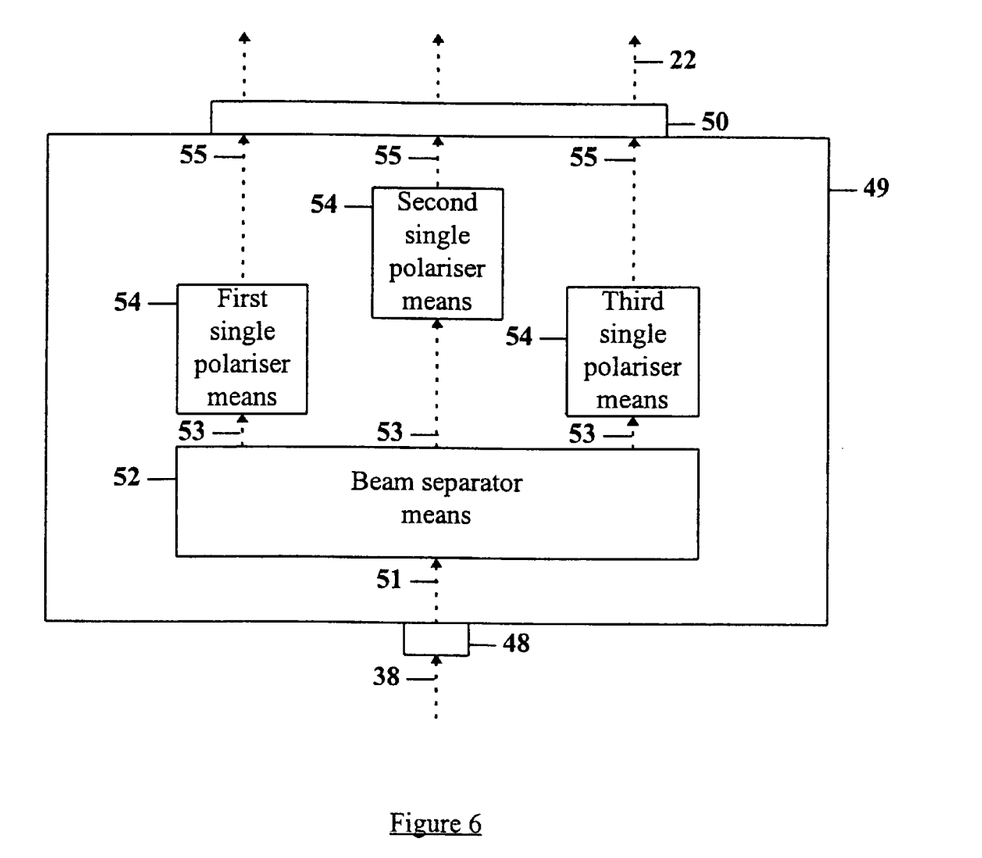
FIG. 6 is a block diagram of an apparatus of the present invention in which the polarization parallel analyzer means includes two or more single polarizer means.

Referring to FIGS. 5 and 6, the polarization parallel analyzer means 49 includes a beam separator means 52. Light 51 input at the input port 48 is separated by the beam separator means 52 into two or more separate beams 53 with negligible polarization dependent loss. Each of the separate beams 53 passes through a separate single polarizer means 54 to become a separate output beam 55, each with a particular receive state of polarization, and where the output beams 55 are output from an output port 50 as the separate channels of light 22.

In a further embodiment of the present invention, there are three of the single polarizer means 54, in which a first one of the single polarizer means 54 comprises a linear polarizer, in which a second one of the single polarizer means 54 also comprises a linear polarizer but with a different orientation of its polarization axis, preferably orthogonal, and in which a third one of the single polarizer means 54 compnses a circular polarizer. The resulting three output beams 55 may be measured in parallel to provide a complete state of polarization of the backscattered light 13.

In a further embodiment of the present invention, there are two of the single polarizer means 54, in which a first one of the single polarizer means 54 comprises a linear polarizer, and in which a second one of the single polarizer means 54 also comprises a linear polarizer but with a different orientation of its polarization axis, preferably orthogonal. Alternatively, the first one of the single polarizer means 54 comprises a linear polarizer, and the second one of the single polarizer means 54 comprises a circular polarizer. The resulting two output beams 55 may be measured in parallel to provide an estimate of a complete state of polarization of the backscattered light 13.

In any embodiment of the present invention the optical components may be such that there may be a residual change in state of polarization which is added to that resulting from the optical fiber 11. The residual change in state of polarization may be measured by a process of calibration in which measurements may be made with the present invention for a particular known optical fiber 11, or with an artefact substituted for optical fiber 11, whose optical transfer function is known. The calibration measurement may then be used to correct a subsequent measurement of an unknown optical fiber 11, and the calibration process may be carried out as often as required to obtain a satisfactory measurement of the residual change.

It is to be appreciated that the embodiments of the invention described above with reference to the accompanying drawings have been given by way of example only. Thus, parts of the illustrated embodiments may be combined in any suitable appropriate order. Also, modifications and additional components may be provided to enhance the performance of the apparatus. Thus, for example, the apparatus may include means for reducing chirping, that is, the variation in wavelength of the tunable source means 2 throughout the duration of each of the launch optical pulses 3. The apparatus may include means to guide and form the light as it passes through the apparatus. Such means may include optical components, such as lenses and mirrors. The apparatus may also include means to improve the signal to noise ratio of the measurements. Such means may include optical components to reduce stray light, or to reduce undesirable changes in the polarization properties of the apparatus of the present invention.

I claim:

1. An apparatus for measuring characteristics of an optical fiber, at different positions along the length of the optical fiber, which apparatus comprises:

tunable source means for providing optical pulses of light which have a variable wavelength and a narrow wavelength bandwidth;

polarization selecting coupler means which comprises an input port, a bidirectional port and an output port, and which is for conveying light between the input port, the bi-directional port and the output port, such that a state of polarization of the optical pulses of light input at the input port becomes a particular launch state of polarization of light output from the bidirectional port, and such that one or more particular receive states of polarization of light input at the bi-directional port become one or more separate channels of light output from the output port;

optical connector means for making an optical connection between the bidirectional port of the polarization selecting coupler means and one end of the optical fiber, so that the light output from the bi-directional port of the polarization selecting coupler means is launched into the optical fiber and the light backscattered within the optical fiber is received as the light input at the bi-directional port of the polarization selecting coupler means;

photodetector means for converting the intensity of each of the one or more separate channels of light output form the output port of the polarization selecting coupler means into one or more separate electrical signals;

launch controller means for controlling the timing, duration and wavelength of the optical pulses provided by the tunable source means, and for specifying the particular launch state of polarization of the light output from the bi-directional port of the polarization selecting coupler means;

receive controller means for controlling the timing of measuring the electrical signals provided by the photodetector means, and for specifying the one or more particular receive states of polarization of light input at the bi-directional port of the polarization selecting coupler means; and processor means for measuring and processing the electrical signals provided by the photodetector means into measurements of the characteristics of the optical fiber, and wherein there is, only one separate channel of light output from the output port of the polarization selecting coupler means, such that the photodetector means converts the intensity of the said one separate channel of light; and in which the polarization selecting coupler means comprises:

polarization independent coupler means which comprises an input port, a bi-directional port and an output port, and which is for conveying light between the input port, the bi-directional port and the output port, with negligible polarization dependent loss of the light, such that light input at the input port become light output from the bi-directional port, light input at the bi-directional port becomes light output from the output port, and the light is substantially unchanged as it passes in either direction between the bidirectional port of the (polarization) polarization selecting coupler means and the bi-directional port of the polarization independent coupler means;

polarization controller means for converting the state of polarization of light input at the input port of the polarization selecting coupler means into a particular launch state of polarization of light input at the input port of the polarization independent coupler means, such that the particular launch state of polarization is selected as specified by the launch controller means; and polarization analyzer means for selecting a particular receive state of polarization of the light output from the output port of the polarization independent coupler means to become the one separate channel of light output from the output port of the polarization selecting coupler means, such that the particular receive state of polarization is selected as specified by the receive controller means.

2. The apparatus according to claim 1 in which the launch controller means specifies, and the polarization controller means selects, only two particular launch states of polarization at each of the wavelengths of the tunable source means controlled by the launch controller means.

3. The apparatus according to claim 1 in which the launch controller means specifies, and the polarization controller means selects, only one particular launch state of polarization at each of the wavelengths of the tunable source means controlled by the launch controller means.

4. The apparatus according to claim 1 in which the receive controller means specifies, and the polarization analyzer means selects, only two particular receive states of polarization of the light output from the output port of the polarization independent coupler means for each of the particular launch states of polarization of the light input at the input port of the polarization independent coupler means at each of the wavelengths of the tunable source means; and in which the processor means is such that the state of polarization of the light backscattered by the optical fiber is deduced from the two particular receive states of polarization.

5. The apparatus according to claim 1 in which the polarization controller means comprises an input polarizer means for selecting a single particular launch state of polarization for the light input to the input port of the polarization analyzer means comprises an output polarizer means for selecting a single particular receive state of polarization of the light output from the output port of the polarization independent coupler means.

6. The apparatus according to claim 5 in which the input polarizer means comprises a linear polarizer, and in which the output polarizer means comprises a linear polarizer.

7. An apparatus for measuring characteristics of an optical fiber, at different positions along the length of the optical fiber, which apparatus comprises:
   tunable source means for providing optical pulses of light which have a variable wavelength and a narrow wavelength bandwidth;
   polarization selecting coupler means which comprises an input port, a bidirectional port and an output port, and which is for conveying light between the input port, the bi-directional port and the output port, such that a state of polarization of the optical pulses of light input at the input port becomes a particular launch state of polarization of light output from the bi-directional port, and such that one or more particular receive states of polarization of light input at the bi-directional port become one or more separate channels of light output from the output port;
   optical connector means for making an optical connection between the bidirectional port of the polarization selecting coupler means and one end of the optical fiber, so that the light output from the bi-directional port of the polarization selecting coupler means is launched into the optical fiber and the light backscattered within the optical fiber is received as the light input at the bi-directional port of the polarization selecting coupler means;
   photodetector means for converting the intensity of each of the one or more separate channels of light output from the output port of the polarization selecting coupler means into one or more separate electrical signals;
   launch controller means for controlling the timing, duration and wavelength of the optical pulses provided by the tunable source means, and for specifying the particular launch state of polarization of the light output from the bi-directional port of the polarization selecting coupler means;
   receive controller means for controlling the timing of measuring the electrical signals provided by the photodetector means, and for specifying the one or more particular receive states of polarization of light input at the bi-directional port of the polarization selecting coupler means; and
   processor means for measuring and processing the electrical signals provided by the photodetector means into measurements of the characteristics of the optical fiber, and wherein there is, only one separate channel of light output from the output port of the polarization selecting coupler means, such that the photodetector means converts the intensity of the one separate channel of light; and in which the polarization selecting the coupler means comprises:
   polarization independent coupler means which comprises an input port, a bi-directional port and an output port, and which is for conveying light between the input port, the bi-directional port and the output port, with negligible polarization dependent loss of the light, such that light input at the input port becomes light output from the bidirectional port, light input at the bi-directional port becomes light output from the output port, the light is substantially unchanged as it passes from the input port of the polarization selecting coupler means to the input port of the polarization independent coupler means, and the light is substantially unchanged as it passes from the output port of the polarization independent coupler means to the output port of the polarization selecting coupler means; and
   bi-directional polarizer means for selecting a particular state of polarization of the light that passes in either direction between the bidirectional port of the polarization independent coupler means and the bi-directional port, of the polarization selecting coupler means.

8. The apparatus according to claim 7 in which the bi-directional polarizer means comprises a linear polarizer.

9. An apparatus for measuring characteristics of an optical fiber, at different positions along the length of the optical fiber, which apparatus comprises:
   tunable source means for providing optical pulses of light which have a variable wavelength and a narrow wavelength bandwidth;
   polarization selecting coupler means which comprises an input port, a bidirectional port and an output port, and which is for conveying light between the input port, the bi-directional port and the output port, such that a state of polarization of the optical pulses of light input at the input port becomes a particular launch state of polarization of light output from the bi-directional port, and such that one or more particular receive states of polarization of light input at the bi-directional port become one or more separate channels of light output from the output port;
   optical connector means for making an optical connection between the bidirectional port of the polarization selecting coupler means and one end of the optical fiber, so that the light output from the bi-directional port of the polarization selecting coupler means is launched into the optical fiber and the light backscattered within the optical fiber is received as the light input at the bi-directional port of the polarization selecting coupler means;

photodetector means for converting the intensity of each of the one or more separate channels of light output from the output port of the polarization selecting coupler means into one or more separate electrical signals;

launch controller means for controlling the timing, duration and wavelength of the optical pulses provided by the tunable source means, and for specifying the particular launch state of polarization of the light output from the bi-directional port of the polarization selecting coupler means;

receive controller means for controlling the timing of measuring the electrical signals provided by the photodetector means, and for specifying the one or more particular receive states of polarization of light input at the bi-directional port of the polarization selecting coupler means; and processor means for measuring and processing the electrical signals provided by the photodetector means into measurements of the characteristics of the optical fiber, and wherein there are two or more separate channels of light output from the output port of the polarization selecting coupler means, such that the photodetector means converts the intensities of the said two or more separate channels of light, and such that the polarization selecting the coupler means comprises:

polarization independent coupler means which comprises an input port, a bi-directional port and an output port, and which is for conveying light between the input port, the bi-directional port and the output port, with negligible polarization dependent loss of the light, such that light input at the input port becomes light output from the bidirectional port, light input at the bi-directional port becomes light output from the output port, and the light is substantially unchanged as it passes in either direction between the bi-directional port of the polarization selecting coupler means and the bi-directional port of the polarization independent coupler means;

polarization controller means for converting the state of polarization of light input at the input port of the polarization selecting coupler means into a particular launch state of polarization of light input at the input port, of the polarization independent coupler means, such that the particular launch state of polarization is selected as specified by the launch controller means; and polarization parallel analyzer means for selecting two or more particular receive states of polarization of the light output from the output port of the polarization independent coupler means to become the two or more separate channels of light output from the output port of the selecting coupler means.

10. The apparatus according to claim 9 in which the launch controller means specifies, and the polarization controller means selects, only two particular launch states of polarization at each of the wavelengths of the tunable source means controlled by the launch controller means.

11. The apparatus according to claim 9 in which the launch controller means specifies, and the polarization controller means selects, only one particular launch state of polarization at each of the wavelengths of the tunable source means controlled by the launch controller means.

12. The apparatus according to claim 9 in which the polarization parallel analyzer means comprises a beam separator means for separating input light into two or more separate beams with negligible polarization dependent loss; and in which the apparatus includes tow or more single polarizer means for selecting a particular receive state of polarization for each of the said two or more separate beams.

13. The apparatus according to claim 12 in which there are three of the single polarizer means, in which a first one of the single polarizer means comprises a linear polarizer, in which a second one of the single polarizer means also comprises a linear polarizer but with a different orientation of its polarization axis, and in which a third one of the single polarizer means comprises a circular polarizer.

14. The apparatus according to claim 9 in which the polarization parallel analyzer means selects only two particular receive states of polarization of the light output from the output port of the polarization independent coupler means for each of the particular launch states of polarization light input at the input port of the polarization independent coupler means at each of the wavelengths of the tunable source means, and in which the processor means is such that the state of polarization of the light backscattered by the optical fiber is deduced from the two particular receive states of polarization.

15. The apparatus according to claim 14 in which the polarization parallel analyzer means comprises a beam separator means for separating input light into only two separate beams; and in which the apparatus includes only two single polarizer means for selecting a particular receive state of polarization for each of the said two separate beams.

16. The apparatus according to claim 15 in which a first one of the single polarizer means comprises a linear polarizer, and in which a second one of the single polarizer means also comprises a linear polarizer but with a different orientation of its polarization axis.

17. The apparatus according to claim 15 in which a first one of the single polarizer means comprises a linear polarizer, and in which a second one of the single polarizer means comprises a circular polarizer.

* * * * *